W. HOLT.
SELF REGULATING DYNAMO ELECTRIC MACHINE.
APPLICATION FILED JAN. 5, 1920.
1,377,074.  Patented May 3, 1921.
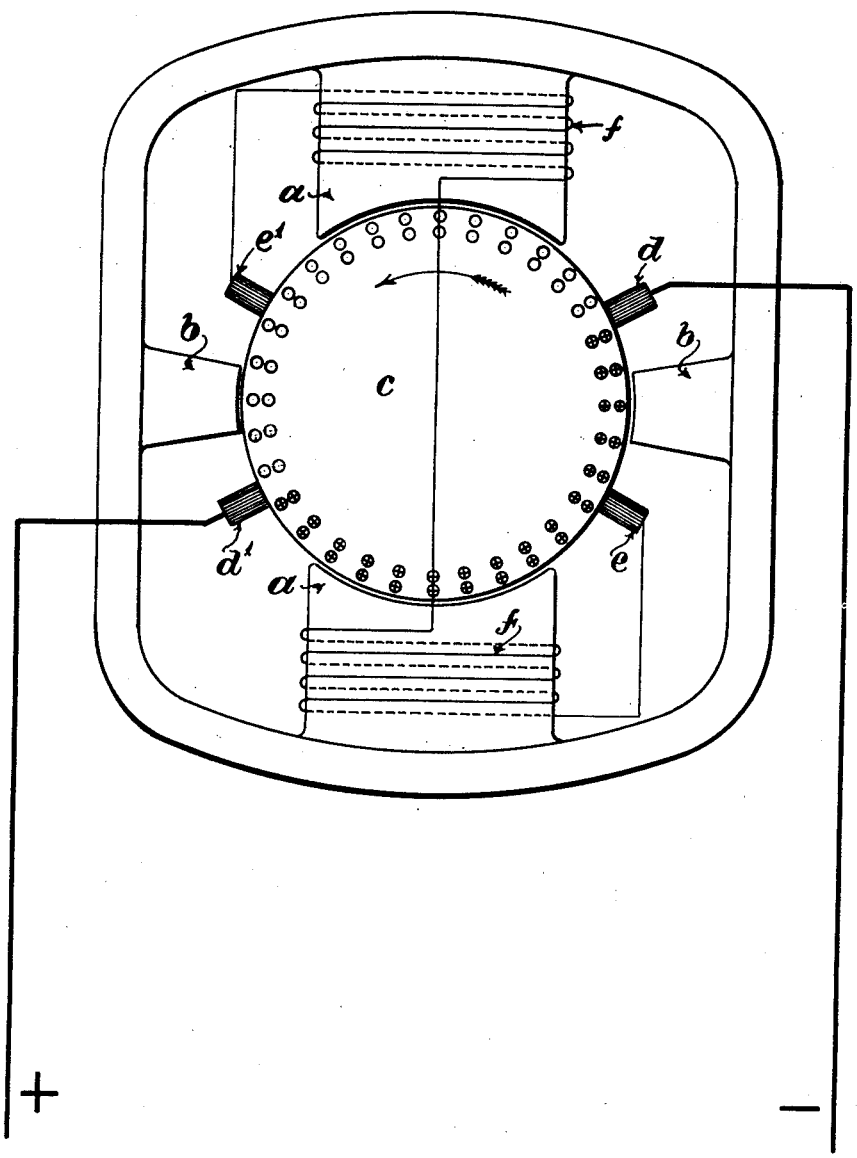

UNITED STATES PATENT OFFICE.

WILLIAM HOLT, OF BIRMINGHAM, ENGLAND, ASSIGNOR OF ONE-HALF TO BROLT LIMITED, OF BIRMINGHAM, ENGLAND.

SELF-REGULATING DYNAMO-ELECTRIC MACHINE.

1,377,074. Specification of Letters Patent. Patented May 3, 1921.

Application filed January 5, 1920. Serial No. 349,561.

*To all whom it may concern:*

Be it known that I, WILLIAM HOLT, subject of the King of Great Britain, residing at Birmingham, England, have invented certain new and useful Improvements in Self-Regulating Dynamo-Electric Machines, of which the following is a specification.

This invention relates to variable-speed self-regulating dynamo-electric machines employed in connection with electric lighting systems of motor-driven vehicles, railway trains and the like, said machines being used in conjunction with a battery of accumulators, and being of that type in which supplementary poles are provided between the main poles in order to receive the cross-magnetization produced by the current flowing in the armature conductors lying under the main poles, this cross-magnetization (in conjunction with supplementary brushes connected to the excitation coils at the main poles) being utilized for the purpose of producing a demagnetizing action upon the main poles when the speed of the machine increases.

The object of the present invention is to provide a more efficient and simplified machine of the above-described type.

Heretofore the excitation coils on the main poles have been connected between a supplementary brush on one side of the respective main pole and a main brush on the other side of said main pole; but according to the present invention the main excitation coils are connected directly across the supplementary brushes.

The accompanying drawing is a diagrammatic representation of a machine which is in accordance with the present invention.

The dynamo comprises main poles $a$ and unwound supplementary poles $b$ situated mid-way between the main poles, these supplementary poles being adapted to receive the cross-magnetization of the armature $c$. Main brushes $d$, $d^1$, are situated upon the leading side of the supplementary poles, and upon the opposite side of said poles supplementary brushes $e$, $e^1$, are provided. The main poles $a$, $a$, are excited by means of shunt coils $f$, $f$, arranged in series and connected directly across the supplementary brushes $e$, $e^1$, as shown.

If the speed of the machine increases, the difference of potential between the supplementary brushes $e$, $e^1$, is reduced, whereby the magnetizing effect of the exciting coils $f$, $f$, is diminished, thus weakening the main field and tending to keep the current output constant. The output curve may also be varied by means of series coils on the supplementary poles.

If desired, the salient supplementary poles may be dispensed with by bringing the sides of the magnet frame close to the armature.

Although the invention has been described with reference to a bi-polar machine, it is obvious that the invention is equally applicable to multi-polar machines.

Having fully described my invention, what I desire to claim and secure by Letters Patent is:—

1. A self-regulating dynamo-electric machine comprising main poles and supplementary poles, a main brush and a supplementary brush upon opposite sides of each supplementary pole, and excitation windings on the main poles connected directly across the supplementary brushes, substantially as described.

2. A self-regulating dynamo-electric machine comprising main poles and supplementary poles, a main brush and a supplementary brush upon opposite sides of each supplementary pole, said supplementary brushes being outside of the influence of the main magnetic field, and exciting windings on the main poles connected directly across said supplementary brushes, substantially as described.

3. A self-regulating dynamo-electric machine comprising main poles, supplementary poles located between said main poles and adapted to provide a path for the cross-field independent of the main magnetic field, main brushes, supplementary brushes between said main and supplementary poles influenced solely by the cross-magnetization, and exciting windings on the main poles connected directly across said supplementary brushes, substantially as described.

In testimony whereof I have hereunto set my hand in presence of two subscribing witnesses.

WILLIAM HOLT.

Witnesses:
W. L. SKERRETT,
H. O. PRATT.